United States Patent [19]

Nakayama et al.

[11] 4,132,202

[45] Jan. 2, 1979

[54] VARIABLE DRIVE COUPLING FOR A FUEL INJECTION PUMP

[75] Inventors: Kenji Nakayama; Koji Yamanoi, both of Higashimatsuyama, Japan

[73] Assignee: Diesel Kiki Co., Ltd., Tokyo, Japan

[21] Appl. No.: 789,332

[22] Filed: Apr. 15, 1977

[30] Foreign Application Priority Data

Apr. 17, 1976 [JP] Japan .................................. 51-43274

[51] Int. Cl.[2] ........................ F02M 39/00; F16D 5/00
[52] U.S. Cl. .................................. 123/139 AP; 64/25
[58] Field of Search ................. 123/139 AP, 139 AQ, 123/139 AD; 417/294; 64/25, 26

[56] References Cited

U.S. PATENT DOCUMENTS

| | | | |
|---|---|---|---|
| 2,722,813 | 11/1955 | Addinger | 123/139 AP |
| 3,174,303 | 3/1965 | Watson | 64/25 |
| 3,693,771 | 9/1972 | De Lancey | 64/26 |
| 3,791,171 | 2/1974 | Hofmann | 123/139 AP |

FOREIGN PATENT DOCUMENTS

| | | | |
|---|---|---|---|
| 1140021 | 11/1962 | Fed. Rep. of Germany | 123/139 AP |
| 491336 | 3/1954 | Italy | 64/25 |

*Primary Examiner*—Charles J. Myhre
*Assistant Examiner*—P. S. Lall
*Attorney, Agent, or Firm*—Edwin E. Greigg

[57] ABSTRACT

The drive shaft of a fuel injection pump is coupled to a power imparting shaft via a centrifugal coupling in which pivoting flyweights determine the relative angular position of the driven and driving shafts. A return spring opposes the outward motion of the flyweights and it is supported on a movable support which can be displaced by hydraulic pressure. The magnitude of the hydraulic pressure determines the relative angular position of the two shafts at any time. A sleeve engages the driving shaft by means of a tongue and groove coupling which is helical so that the imparted torque causes an axial displacement of the sleeve, resulting in a change in the overflow cross section for the hydraulic fluid, thereby altering the effective pressure on the spring support. This changes the relative angle of the two shafts which, in turn, alters the onset of fuel injection.

9 Claims, 3 Drawing Figures

VARIABLE DRIVE COUPLING FOR A FUEL INJECTION PUMP

BACKGROUND OF THE INVENTION

The invention relates to an apparatus for changing the onset of fuel injection within a fuel injection pump intended to supply internal combustion engines. The fuel injection pump to which this invention relates is supplied with a rotating shaft equipped with flyweights that move under a centrifugal force and are returned by a return spring. The position of the flyweights determines the relative rotational position of a driven and a driving shaft.

The prevailing and increasingly rigorous regulations regarding environmental contamination, i.e., exhaust gas regulations, make it imperative that the onset of injection, i.e., the timing of the injection of fuel by a fuel injection pump, be made dependent not only on the engine rpm but also on other operational variables, for example the injected fuel quantity, i.e., the load on the engine. Thus, the power as well as the exhaust gas conditions could be considered in the operation of the engine. When the engine is heavily loaded and the combustion temperature rises, the injection onset must be retarded or moved back so as to limit the concentration of $NO_x$ components in the exhaust gases and to thereby lower the combustion temperature. It is known to provide this requirement by an apparatus disclosed in the Japanese Pat. No. 47-40228 and the laid-open patent application No. 47-23720 which describe control systems that employ electrical and other means to obtain a correction of the onset point for fuel injection on the basis of engine rpm and of engine load. However, the electrical circuits and the hydraulic actuating members described in these publications are very complicate and expensive and require substantial amounts of space.

OBJECT AND SUMMARY OF THE INVENTION

It is a principal object of the present invention to provide a device for shifting the onset of fuel injection of a fuel injection pump for an internal combustion engine.

It is a further object of the invention to provide a device of this type which does not have the above-described disadvantages and which permits a change of the onset of injection automatically as a function of engine rpm as well as in dependence on another operational variable, for example engine load.

These and other objects are attained according to the present invention by providing an apparatus which includes an rpm-dependent centrifugal governor in which the force of the return springs for the flyweights can be changed by changing the position of a hydraulically actuated pressure piston. The controlled fluid pressure for actuating the piston is obtained by a throttle valve which is itself controlled by the driving torque acting on the fuel pump or by means which gauge the fuel quantity metered out, i.e., in load-dependent manner.

The invention includes several distinct features for attaining the above-cited objects. One of these features is an automatic load-dependent change of the onset of injection without external influence by means of a screw coupling of the driven and driving shafts of the installation. Another of these features is to change the hydraulic pressure acting on the return spring of the flyweights depending on the position of a control cable or lever which sets the fuel quantity metered out to the engine.

The invention will be better understood as well as further objects and advantages thereof become more apparent from the ensuing detailed description of a preferred embodiment taken in conjunction with the drawing.

DESCRIPTION OF THE PREFERRED EMBODIMENT

Figure 1:
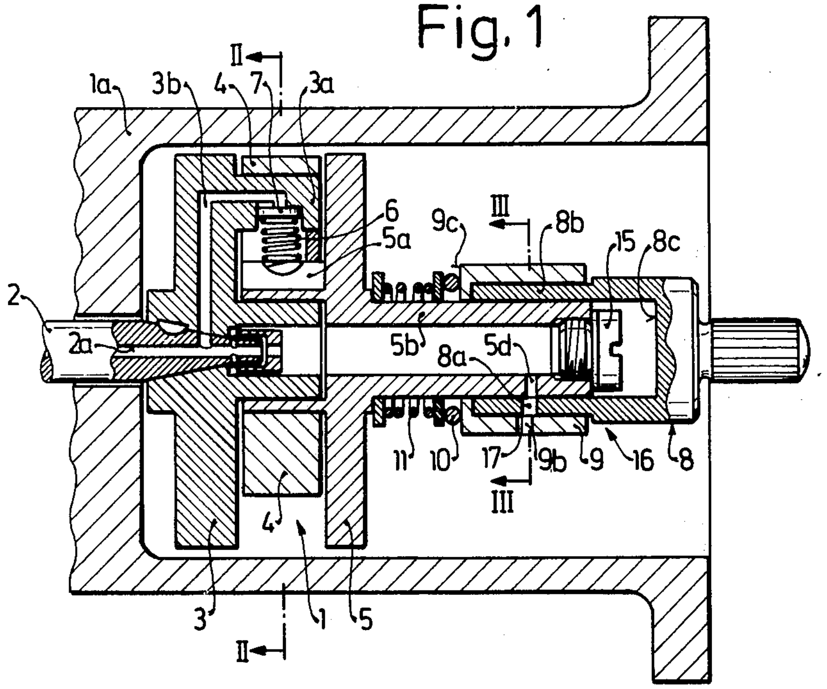
FIG. 1 is an axial section through a preferred embodiment of the apparatus according to the invention.
Figure 2:
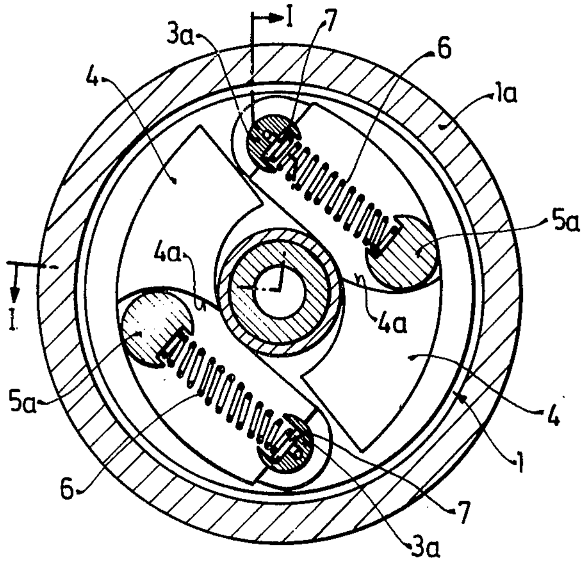
FIG. 2 is a section along the line II—II in FIG. 1.

Turning now to FIG. 1, there will be seen a housing **1*a* of a fuel injection pump including a known centrifugal injection timing adjustment mechanism 1 which has a carrier flange 3 fastened on the injection pump cam shaft 2. Attached to or integral with the bearing flange 3 are two carrier pins 3*a* which act as the pivotal bearings for flyweights 4 which have cam tracks 4*a*. Following the cam tracks 4*a* of the flyweights 4 are driver bolts 5*a* attached to a driving flange 5. The driver bolts 5*a* remain in contact with the cam tracks 4*a* due to the driving torque imparted to the injection pump as well as due to the compressive force of two return springs 6 disposed between the carrier bolts 3*a* and the driver bolts 5*a*. The springs 6 are supported in the carrier pins 3*a* on hydraulically actuated pressure pistons 7 which are displaceable in pressure sealing fashion within bores of the carrier pins 3*a*. Each pressure piston 7 is exposed to the lubricating oil pressure of the engine by an oil line 2*a* bored in the cam shaft 2 and through oil channels 3*b* within the bearing flange 3. The hollow hub 5*b* of the driving flange 5 is closed at one end by a screw-in plug 15 and has two substantially axial but opposite and helical grooves 5*c*. Surrounding the hub 5*b* in oil sealing manner is a hollow cylindrical shaft 8** which is the drive shaft for the fuel pump and is itself driven by the internal combustion engine.

Figure 3:
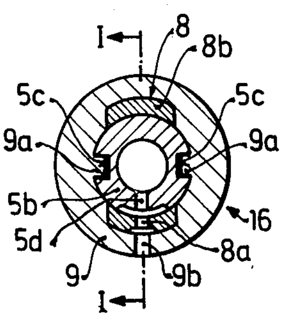
FIG. 3 is a partial section along the line III—III in FIG. 1.

As will be seen especially clearly in FIG. 3, the terminal portion of the shaft 8 is relieved and cut away so as to leave only two parallel opposite portions **8*b*. A sleeve 9 having protrusions 9*a* which mate with the helical grooves 5*c* of the hub 5*b* is fitted over the shaft 8. The elements 5*b*, 8 and 9 together form a twist-coupled coupling 16 which also serves as an oil throttling valve, as will be explained below. For the purpose of throttling oil flow, the hub 5*b* has an oil outlet opening 5*d*, and the remaining portion 8*b* of the shaft 8 has an oil outlet opening 8*a* while the sleeve 9 has an outlet 9*b*. All of these outlets are so arranged that the outlet 8*a* and the outlet 9*b* form a throttling channel 17, the free cross section of which depends on the position of the sleeve 9. A helical spring 11 is disposed on the hub 5*b* and exerts a force on the face 9*c* of the sleeve 9 as well as on the driving flange 5. A pressure bearing 10 is disposed between the spring and the sleeve face 9*c***.

The manner of operation of the apparatus just described will now be explained. When the balanced state of equilibrium between the engine power and the engine load is changed, the engine rpm will also change; e.g. if the load increases, the rpm has a tendency to drop. Accordingly, the fuel injection pump governor causes an increase in the supply of fuel and the increased fuel causes the engine torque to be increased. The increased engine torque is transmitted via the elements 8b of the shaft 8 and via the sleeve 9 to the driving flange 5 and the hub 5b of the driving flange 5 exerts a force on the sleeve 9 which causes an increase in the axial forces exerted by the screw-like engagement of the sleeve 9 and the hub 5b and acting in opposition to the force of the spring to shift the position of the sleeve 9 until equilibrium is restored. As a result, the throttling channel 17 formed by the cooperation of the openings 8a and 9b is reduced in size and the oil pressure acting on the pressurized pistons 7 increases. This increases the effective tension of the springs 6 which in turn causes the driving bolts 5a to be displaced in a manner causing the flyweights 4 to move inwardly towards the axis of the shaft 2. This movement automatically retards the onset of injection, i.e., it causes the onset of fuel injection to take place at a later time than was previously the case. When the engine load decreases from equilibrium, the entire process just described takes place in the opposite order.

It should be noted that the present invention is not limited to the above-described practical exemplary embodiment, but, for example, the lubricating oil pressure may be controlled on the basis of the injected fuel quantity which is in direct proportion to engine load, i.e., depending on the position of the fuel quantity control lever or actuator. For example, in a minor variant of the illustrated exemplary embodiment (not shown) the above-described sleeve 9 may be coupled to the fuel control lever and may be so changed in its position. This lever or actuator may be of any conventional type such as the control rod of a conventional centrifugal force speed governor for fuel injected internal combustion engines. As is well known such a control rod serves as a fuel supply rate adjusting member thereby constituting a fuel rate of fuel quantity controller. A suitable linkage may be provided which is connected between the fuel quantity control rod and sleeve 9 so that the sleeve 9 is moved axially in response to the movement of the rod. In that case, a twisting coupling is not always required and the helical spring 11 acts only as a play-removing spring.

In a further variant of the illustrated embodiment (not further shown) an electromagnetic pressure control valve may be inserted in the lubricating oil line and controlled by a switch which actuates the valve when the fuel control lever indicates an increased fuel quantity. In that case, a stepwise control would be obtained but known means exists for providing a proportional control.

The foregoing relates to a preferred exemplary embodiment, it being understood that other embodiments and variants thereof are possible within the spirit and scope of the invention.

What is claimed is:

1. A drive coupling for a fuel injection pump including a power imparting shaft and a power receiving shaft, disposed in mutually coaxial configuration within a housing, one of said shafts carrying movable flyweights which move apart under the influence of centrifugal force, the other of said shafts having means for engaging said flyweights to thereby transmit rotary motion between said shafts, the motion of said flyweights being opposed by at least one return spring, wherein the improvement comprises:

a movable support means for said at least one support spring, said movable return means being coupled to a source of hydraulic pressure; and means for supplying hydraulic pressure from said source in dependence on the magnitude of an engine variable other than engine speed;

whereby the position of said support means and the force of said return spring can be altered to thereby alter the relative angular orientation of said shafts.

2. A drive coupling as defined by claim 1, wherein said engine variable is engine load.

3. A drive coupling as defined by claim 1, wherein said engine variable is the injected fuel quantity.

4. A drive coupling as defined by claim 1, wherein said movable support is a hydraulic piston connected to said means for supplying hydraulic pressure.

5. A drive coupling as defined by claim 4, wherein said means for supplying hydraulic pressure includes a movable sleeve having an aperture surrounding said power imparting shaft, such that the axial position of said sleeve determine the amount of flow therethrough of the fluid which provides said hydraulic pressure admitted to said hydraulic piston.

6. A drive coupling as defined by claim 5, further comprising tongue and groove means for coupling the relative motions of said sleeve and said power imparting shaft, said groove being helical and so disposed that, when torque is applied to said sleeve, said tongue and groove means translate a portion of said torque into an axial force tending to move said sleeve axially on said power imparting shaft; and further comprising a spring on said power imparting shaft to oppose the axial motion of said sleeve thereon.

7. A drive coupling as defined by claim 1, wherein said movable support is a hydraulic piston connected to said means for supplying hydraulic pressure and wherein the latter includes a movable sleeve surrounding said power imparting shaft, the position of said sleeve defining the cross section of an aperture for fluid which provides said hydraulic pressure admitted to said hydraulic piston, and wherein said movable sleeve is coupled to a fuel rate controller of said fuel injection pump; whereby said sleeve is moved in dependence on the injected fuel quantity.

8. A drive coupling as defined by claim 1, further comprising a pressure control valve, coupled to a fuel quantity controller and disposed in the line admitting hydraulic pressure to said movable support means; whereby the hydraulic pressure acting on said movable support means is controlled in dependence on the injected fuel quantity.

9. A drive coupling as defined by claim 8, wherein said pressure control valve is an electromagnetic valve actuated by a switch which is coupled to the motion of a fuel control lever of said fuel injection pump.

* * * * *